United States Patent
Clark

(10) Patent No.: US 10,747,648 B2
(45) Date of Patent: *Aug. 18, 2020

(54) MOCK OBJECT GENERATION

(71) Applicant: Home Box Office, Inc., New York, NY (US)

(72) Inventor: Brendan Joseph Clark, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/856,762

(22) Filed: Dec. 28, 2017

(65) Prior Publication Data
US 2018/0121330 A1    May 3, 2018

Related U.S. Application Data

(63) Continuation of application No. 14/841,597, filed on Aug. 31, 2015, now Pat. No. 9,870,311.

(Continued)

(51) Int. Cl.
G06F 9/44    (2018.01)
G06F 9/45    (2006.01)
(Continued)

(52) U.S. Cl.
CPC .......... *G06F 11/3664* (2013.01); *G06F 8/315* (2013.01); *G06F 11/3684* (2013.01); *G06F 11/3672* (2013.01)

(58) Field of Classification Search
CPC ............. G06F 11/3664; G06F 11/3672; G06F 11/3684; G06F 8/315
See application file for complete search history.

(56) References Cited

U.S. PATENT DOCUMENTS 7,596,694 B1    9/2009  Karp et al.
7,797,708 B2*   9/2010  Weber ..................... G06F 16/21
                                                     719/313

(Continued)

FOREIGN PATENT DOCUMENTS

WO    20080038265    4/2008
WO    20130158112    10/2013

OTHER PUBLICATIONS

Jagadeesh Nandigam, Interface-Based Object-Oriented Design with Mock Objects, 2009, pp. 714-718. https://ieeexplore.ieee.org/stamp/stamp.jsp?tp=&arnumber=5070704 (Year: 2009).*

(Continued)

*Primary Examiner* — Mongbao Nguyen
(74) *Attorney, Agent, or Firm* — Amin, Turocy & Watson, LLP

(57) ABSTRACT

Techniques are provided for automatically generating a mock object from a description of a real object, such as for use in testing. Mock object generation logic parses the description to determine interface(s) of the real object, which are replicated in the mock object, and to determine method(s) of the real object, which are simulated in the mock object. The mock object generation logic may generate a description of the mock object that is then compiled into the mock object for execution. Data types may be validated so that the arguments and/or return values from the mock object meet the expectations of a calling object.

15 Claims, 9 Drawing Sheets

Related U.S. Application Data

(60) Provisional application No. 62/046,090, filed on Sep. 4, 2014.

(51) Int. Cl.

| | | |
|---|---|---|
| *G06F 9/445* | (2018.01) | |
| *G06F 11/36* | (2006.01) | |
| *G06F 8/30* | (2018.01) | |

(56) References Cited

U.S. PATENT DOCUMENTS

| | | | |
|---|---|---|---|
| 8,311,794 | B2 | 11/2012 | Saterdag et al. |
| 8,627,296 | B1* | 1/2014 | Picard ................. G06F 11/3684 717/124 |
| 8,789,032 | B1 | 7/2014 | Li et al. |
| 8,954,929 | B2* | 2/2015 | Braude ............... G06F 11/3688 717/124 |
| 9,935,823 | B1* | 4/2018 | Rosh ....................... H04L 41/22 |
| 2002/0188649 | A1 | 12/2002 | Karim |
| 2007/0033443 | A1* | 2/2007 | Tillmann ............ G06F 11/3684 714/45 |
| 2007/0244158 | A1* | 10/2007 | Miyake ................ C07D 211/58 514/317 |
| 2007/0277158 | A1 | 11/2007 | Li et al. |
| 2008/0127093 | A1 | 5/2008 | Fernandez-Ivern et al. |
| 2008/0256517 | A1* | 10/2008 | Atkin .................. G06F 11/3688 717/124 |
| 2009/0007073 | A1 | 1/2009 | Huang et al. |
| 2009/0083578 | A1* | 3/2009 | Nan ..................... G06F 11/3696 714/28 |
| 2010/0077381 | A1* | 3/2010 | Allen .................. G06F 11/3684 717/124 |
| 2011/0239194 | A1 | 9/2011 | Braude |
| 2012/0084754 | A1 | 4/2012 | Ziegler et al. |
| 2013/0097587 | A1 | 4/2013 | Lopian |
| 2013/0145351 | A1 | 6/2013 | Tunik et al. |
| 2013/0311830 | A1* | 11/2013 | Wei ..................... G06F 11/3684 714/32 |
| 2013/0326483 | A1* | 12/2013 | Furodet ............... G06F 11/3688 717/124 |
| 2014/0068334 | A1* | 3/2014 | Horsman ............ G06F 11/3684 714/32 |
| 2014/0095142 | A1 | 4/2014 | Baldwin |
| 2014/0101640 | A1* | 4/2014 | Romdhane .......... G06F 11/3684 717/125 |
| 2014/0331204 | A1 | 11/2014 | Godefriod |
| 2015/0100946 | A1* | 4/2015 | Brunswig ........... G06F 11/3664 717/124 |
| 2015/0135158 | A1 | 5/2015 | Tenev et al. |
| 2015/0378880 | A1* | 12/2015 | Kucharski ........... G06F 11/3612 717/130 |
| 2016/0147642 | A1 | 5/2016 | Haeuptle et al. |

OTHER PUBLICATIONS

David Saff, Mock object creation for test factoring, 2004, pp. 49-51. https://dl.acm.org/doi/abs/10.1145/996821.996838 (Year: 2004).*

Jagadeesh Nandigam, Interface-Based Object-Oriented Design with Mock Objects, 2009, pp. 713-718. https://ieeexplore.ieee.org/stamp/stamp.jsp?tp=&arnumber=5070704&isnumber=5070575 (Year: 2009).*

International Search Report and Written opinion from International Patent Application Serial No. PCT/US15/47902, dated Nov. 16, 2015, 13 pages.

Simon Raffeiner: "Functionality and Design of the CMock framework," 2009, 8 pages.

Benny Pasternak, et al: "GenUTest: A Unit Test and Mock Aspect Generation Tool," Oct. 23, 2007, 15 pages.

Office Action for U.S. Appl. No. 14/841,597, dated Nov. 10, 2016, 50 pages.

Buschtons, T., "How to write better Jasmine tests with mocks," EclipseSource Blog, Mar. 27, 2014, 7 pages.

Final Office Action for U.S. Appl. No. 14/841,597, dated May 17, 2017, 28 pages.

Notice of Allowance for U.S. Appl. No. 14/841,597, dated Sep. 6, 2017, 46 pages.

Samimi, "Declarative Mocking," http://web.cs.ucla.edu/-todd/research/issta13.pdf, 2013, pp. 246-255.

"Snider, ""Using Class Interface and Mock Objects to Unit Test Aspects,"" http://nsuworks.nova.edu/cgilviewcontent.cgi?article=1 0 13&context=gscis _ etd, 2014, pp. 20-64."

Marton, "C++ Compile-time Reflection and Mock Objects," http://www.cs.ubbcluj.ro/-macs/2014/abstracts/absMarton_Gabor .pdf, 2014, pp. 1-16.

\* cited by examiner

550

```
return interfaceDef("example.IExample", undefined, function () {
    methods({
    exampleMethod: undefined
    });
});

docs.registerDoc({
    namespace: "example",
    className: " IExample ",
    description: "Example interface.",
    methods: [
      {
        name: " exampleMethod ",
        description: "Example method.",
        args: [
          {
            name: "argument",
            description: "The first argument",
            validation: docs.validation.isNumber
          },
        returnValue: {
            description: "The return value",
            validation: docs.validation.isString
        }
      });
```

*FIG. 5*

```
fn GenerateMock(name, API)
file = "Class:name"
        |
        |
$constructor
$methods
$events
$properties
```

*FIG. 7A*

```
Fn generateMethod(file, entry)
    file $method.add()
    entryname:(arg arg1)
    return entry, return value
```

*FIG. 7B*

```
$method.Name:function($argument)
Return $return value
$method Name=entry.name //exampleMethod
$argument = generate.Type(entry.argument) //number
$return value = generateType(entry.returnvalue) //string
```

*FIG. 7C*

MOCK OBJECT GENERATION

CROSS-REFERENCE TO RELATED APPLICATION

The present application claims priority to copending U.S. patent application Ser. No. 14/841,597, filed Aug. 31, 2015, which claims priority to U.S. provisional patent application Ser. No. 62/046,090, filed Sep. 4, 2014.

BACKGROUND

In testing a computer program, exercising a small portion of the program in isolation, such as a unit test, is often a good way to find bugs or other inefficiencies in the tested portion. Thus, a significant consideration when developing a unit test is isolation.

In object-oriented programs, one way to achieve the desired isolation is by creating a mock (or mock object), comprising a counterpart object to a real object (which may be a class depending on the programming environment) that adheres to a particular interface but typically provides only a basic or non-functional implementation. Because of its simplicity, a mock object is highly unlikely to contain any bugs. Testing one object while mocking (one or more of) the other objects on which the object under test depends allows for a high degree of isolation of the tested object.

However, a problem with mock objects is that generating and maintaining the mock objects is very tedious and time-consuming. For example, every time a developer changes the interface, method or other portion of a real program object, the developer (or other person on the team) also needs to change the corresponding mock counterpart.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards generating a mock object from a description of a real object, including parsing the description with mock object generation logic to determine an interface set and a method set that exist within the real object, replicating the interface set of the real object in the mock object, and simulating the method set of the real object in the mock object. Replicating the interface set of the real object in the mock object and simulating the method set of the real object in the mock object may include generating a description of the mock object and compiling the description of the mock object into the mock object.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which:

FIG. 5 is a representation of an example object description, according to one example implementation, according to one or more example implementations.

FIG. 7A is a representation of part of a function configured to generate a mock object, according to one or more example implementations.

FIG. 7B is a representation of part of a function configured to generate a method of a mock object, according to one or more example implementations.

FIG. 7C is a representation of part of a mock object description, according to one or more example implementations.

DETAILED DESCRIPTION

Figure 1:
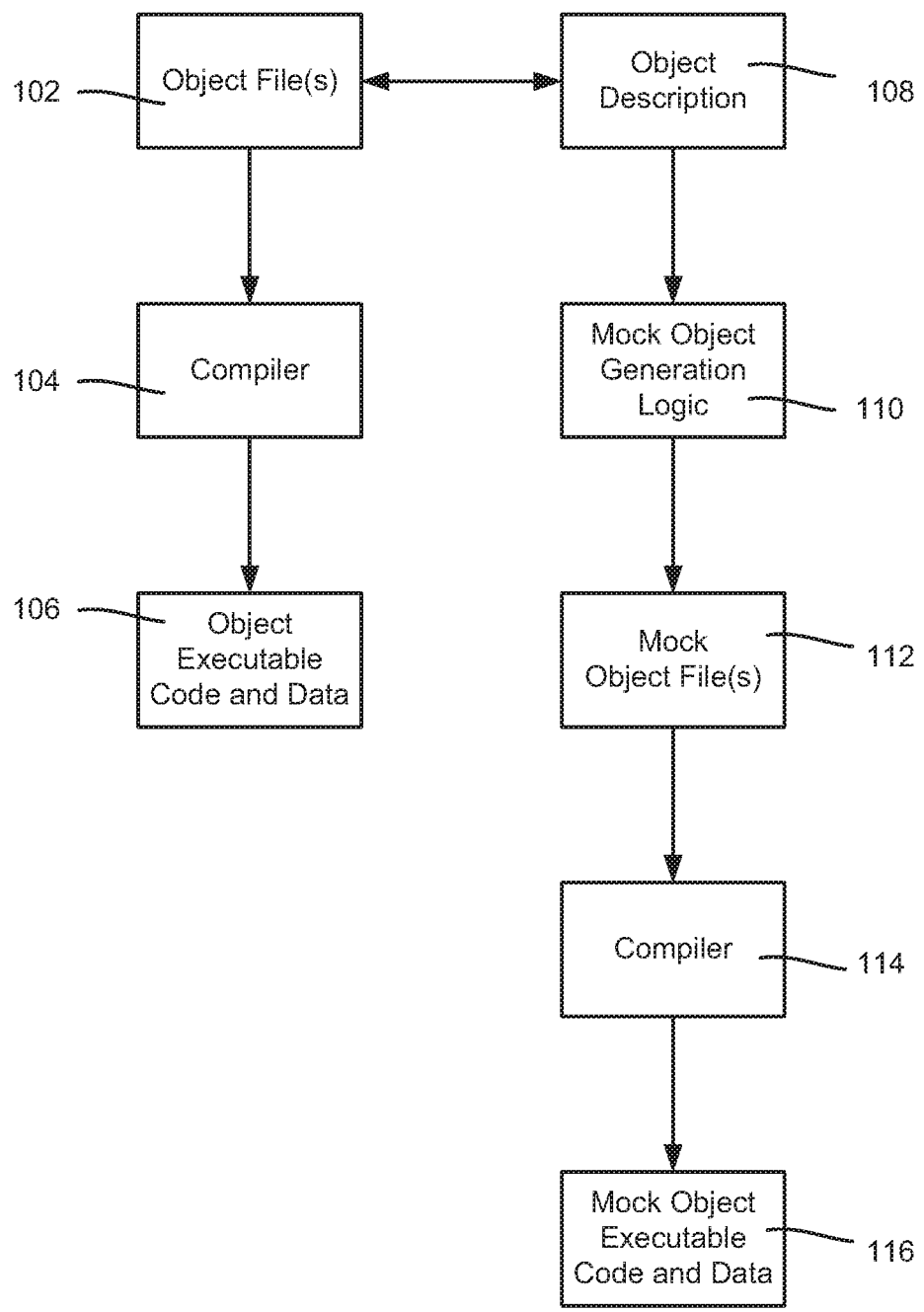
FIG. 1 is a block diagram showing various example components of an example real and mock object generation environment, according to one or more example implementations.

Various aspects of the technology described herein are generally directed towards a technology in which mock objects are automatically generated, including as a result of the counterpart real object (its class) being modified in some way. As used herein, "class" and "object" (an instantiated instance of the class) are generally synonymous unless otherwise noted, and indeed, "object" is generally used herein for simplicity and because a prototype programming language such as JavaScript® does not have classes. Thus, as used herein, a "mock object" corresponds to a "real object," including before or after instantiation of any class or an object's creation from a prototype object.

In general, a mock object is a simplified version of its counterpart real object that implements the real object's interfaces, such that any call to an interface of the mock object is properly supported from the perspective of the caller. As will be understood, in addition to supporting the same interfaces, a mock object may be automatically generated or otherwise configured to more closely mock the real object, such as to provide return values in the format expected by the caller, e.g., a string when the calling object expects a string in return, an integer when expected, and so on.

Typically most of the functionality available from a real object's methods is removed or significantly simplified in the mock object. In this way, the mock object is highly unlikely to contain any bugs that may interfere with the object or objects under test. Notwithstanding, if some functionality is needed to more thoroughly test the calling object, functionality may be added as desired, e.g., by a developer of the object/mock object, whether added automatically or manually. By way of example, consider that a calling object C may expect that a string be returned that is N characters in length, where N is an argument provided by the object C when calling an object W. If the developer deems this functionality as significant in testing the object C, (e.g., the object C throws an exception and prematurely ends the desired type of testing when the returned string is not the length that is requested), then the developer may cause the mock object W' (corresponding to the real object W) to perform this functionality correctly in the appropriate method (or methods) called by object C. As will be understood, this functionality may be manually added, automatically added, or may be added by a combination of manual and automated actions.

Note that as used herein, a real object may be referenced by an uppercase letter such as X, a mock object as an uppercase letter prime (apostrophe), e.g., X', a different mock object for the same real object as an uppercase double prime, e.g. X" and so on; (note that a real object such as X may be mocked in more than one way, e.g., one mock object X' with no functionality, another mock object X" with some functionality, yet another mock object X''' with different functionality, and so on). By way of example, consider a mock object B' that uses the same interface as real object B (e.g., related to crossword puzzle generation) in which the calling object C provides a starting character and a string length. The mock object B' may be configured to return some random string that fills in the remaining length, whereas another mock object B" may be coded to look up and return an actual dictionary word that fills in the remaining length or a NULL if no such dictionary word exists.

In general, a mock object may be automatically generated from a suitable description of the real object, such as in the interface description language often used to generate the real object. Another part of generating a mock object may use document-based validation or the like, e.g., text that describes and validates arguments, properties and so forth. Automatically generated mock objects need not be limited to mocking interfaces, as they can be generated for regular class definitions just as easily. Note that the more specific the description, the more closely automated mock generation can be made to mock the original object, if desired. For example, the description may state that the object needs to return a four character string that starts with the letters "Ab," whereby the mock object may be automatically generated with this functionality by parsing the description and validation document, possibly including parsing comments.

Notwithstanding the benefits of automatic mock object generation as described herein, as set forth above, a developer also may manually customize a mock object (e.g., a mock object that is automatically generated in part) to any extent desired to enhance the testing of the other object (or set of other objects) to be tested. Thus, for example, if an automatically generated mock object does not have a particular functionality of the real object, a developer can copy one or more subsets of the code from the real object into the mock object and if desired modify that copied code in the mock object. This may be done, for example, to isolate a problem between an object under test against individual functions of the object being mocked to narrow down where a problem exists.

It should be understood that any of the examples herein are non-limiting. As such, the technology described herein is not limited to any particular implementations, embodiments, aspects, concepts, structures, functionalities or examples described herein. Rather, any of the implementations, embodiments, aspects, concepts, structures, functionalities or examples described herein are non-limiting, and the technology may be used in various ways that provide benefits and advantages in computing and object-oriented concepts in general.

FIG. 1 shows an example of an environment suitable for generating mock objects. In FIG. 1, a developer or the like uses one or more tools such as text editors/graphic (visual) programming tools to create one or more files 102, which when compiled (or interpreted) by a suitable compiler 104 or the like are useable as an object 106 comprising executable method code and data, whether in the conventional object-oriented class-based sense or in the JavaScript® prototype-based sense.

As part of the development process, a description 108 of the object is provided, which may be written manually at least to an extent, possibly enhanced by the use of one or more tools. Interface description language (IDL) provides one such description of the object, although it is understood that other description formats (such as ODL, or Object Definition Language) may be used for mock object generation, as long as they can be parsed. Note that processing the IDL is one way to generate the code file or files that can be compiled into the real object.

As described herein, the object description 108, comprising one or more files, is processed by mock object generation logic 110 to automatically generate one or more mock object generation files 112. A compiler (or interpreter) 114, (which may be the same as the compiler 104) processes these files in the same way as for a real object to create the mock object 116 for use as desired in place of the counterpart real object 106.

Figure 2A:
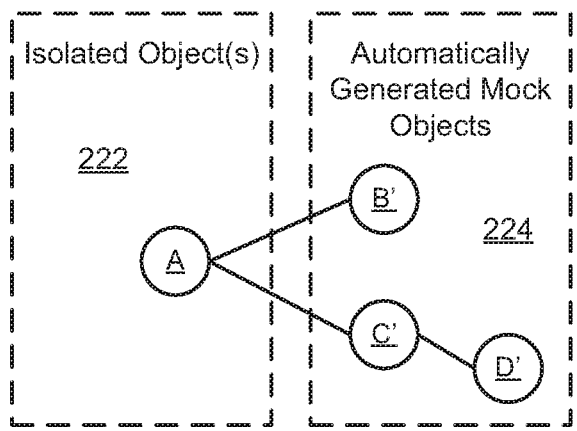
FIGS. 2A and 2B are representations of how a mock object may be used in a test environment to test real objects, according to one or more example implementations.
Figure 2B:
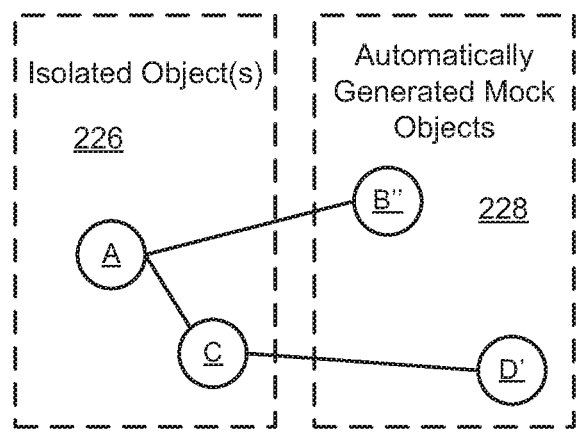

As shown in FIG. 2A, automatically generated mock objects 222 (including B', C' and D' in the example of FIG. 2A) are used to isolate an object set 224 comprising one or more other objects, shown as object A in this example, such as for unit testing of object A. FIG. 2B is similar, however two objects 226 (A and C) are being tested. Further, a different variation of one of the mock objects, mock object B", is used in place of mock object B' in a modified set of the mock objects 228.

Note that for brevity, the term "set" as used herein with respect to a term refers to one or more instances of that term, and possibly zero or more when not even one need be present. Thus, "object set" refers to one or more objects, "interface set" refers to one or more interfaces, "method set" refers to one or more methods (or possibly zero or more if none are needed), and so on for other object-oriented concepts such as constructor(s), event(s), property(ies), argument(s), return value(s) and the like.

Figure 3:
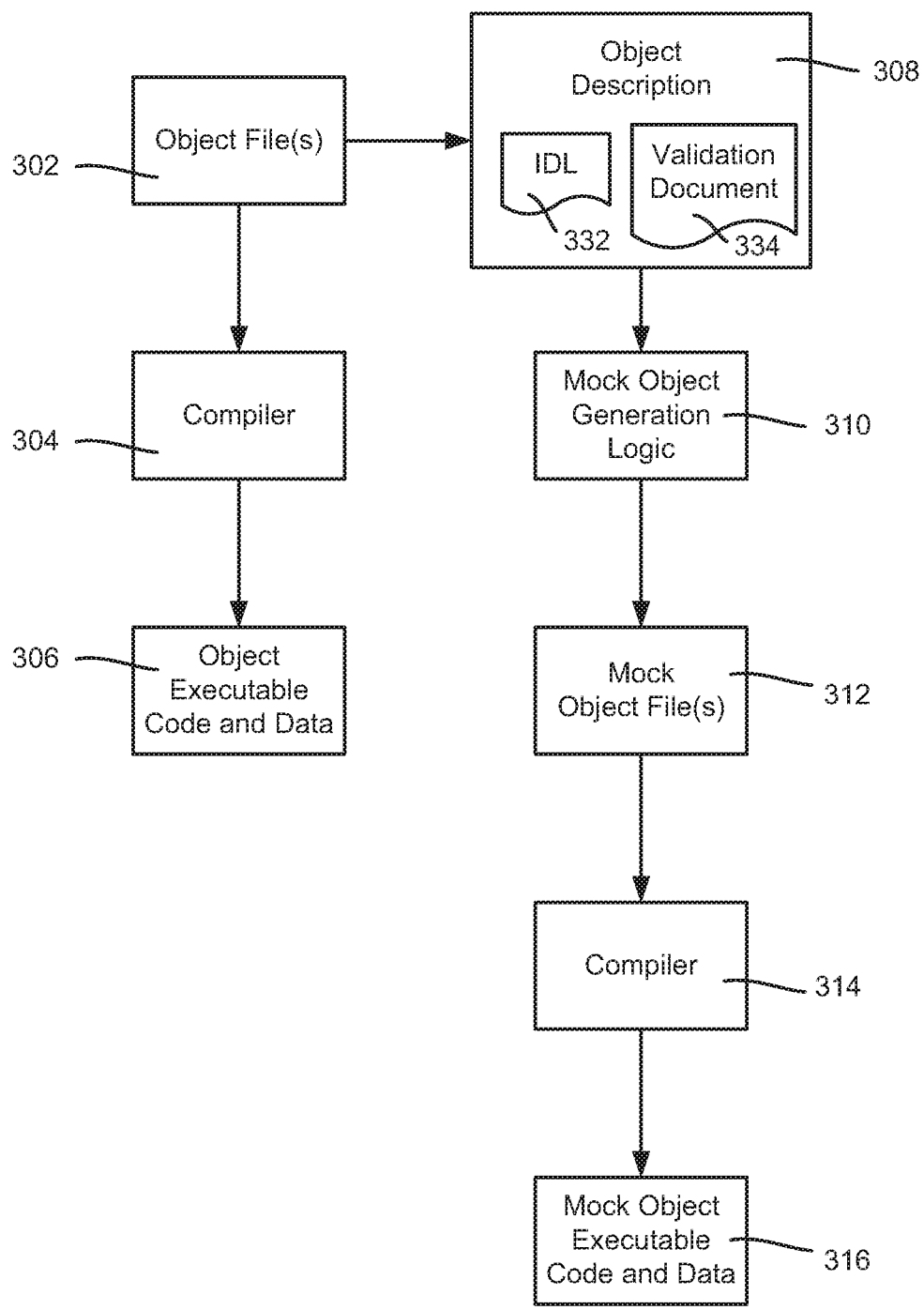
FIG. 3 is a block diagram showing various example components of an example real and mock object generation environment, including the use of validation, according to one or more example implementations.

FIG. 3 shows an example in which (at least) two files are used within the object description 308, shown as the IDL 332 and a validation document 334; (note that in FIG. 3, the numerals labeling elements that correspond to those in FIG. 1 are generally labeled 3xx instead of 1xx). In general, the validation document 334 comprises the output of a process (e.g., implemented as a tool) that validates arguments and return values and so forth, e.g., "this method ABC takes an integer as an argument and returns a Boolean." The validation document 334 is typically in human-readable form, but need not be as long as it is understood by the mock object generation logic. Note that the IDL or the like and any validation document content may be merged into a single document, or alternatively, separated into more than two documents. In general, any type of content that describes an object and that can be input and processed by logic may be used by the mock object generation logic, including comments, semantic hints and so forth.

Figure 4:
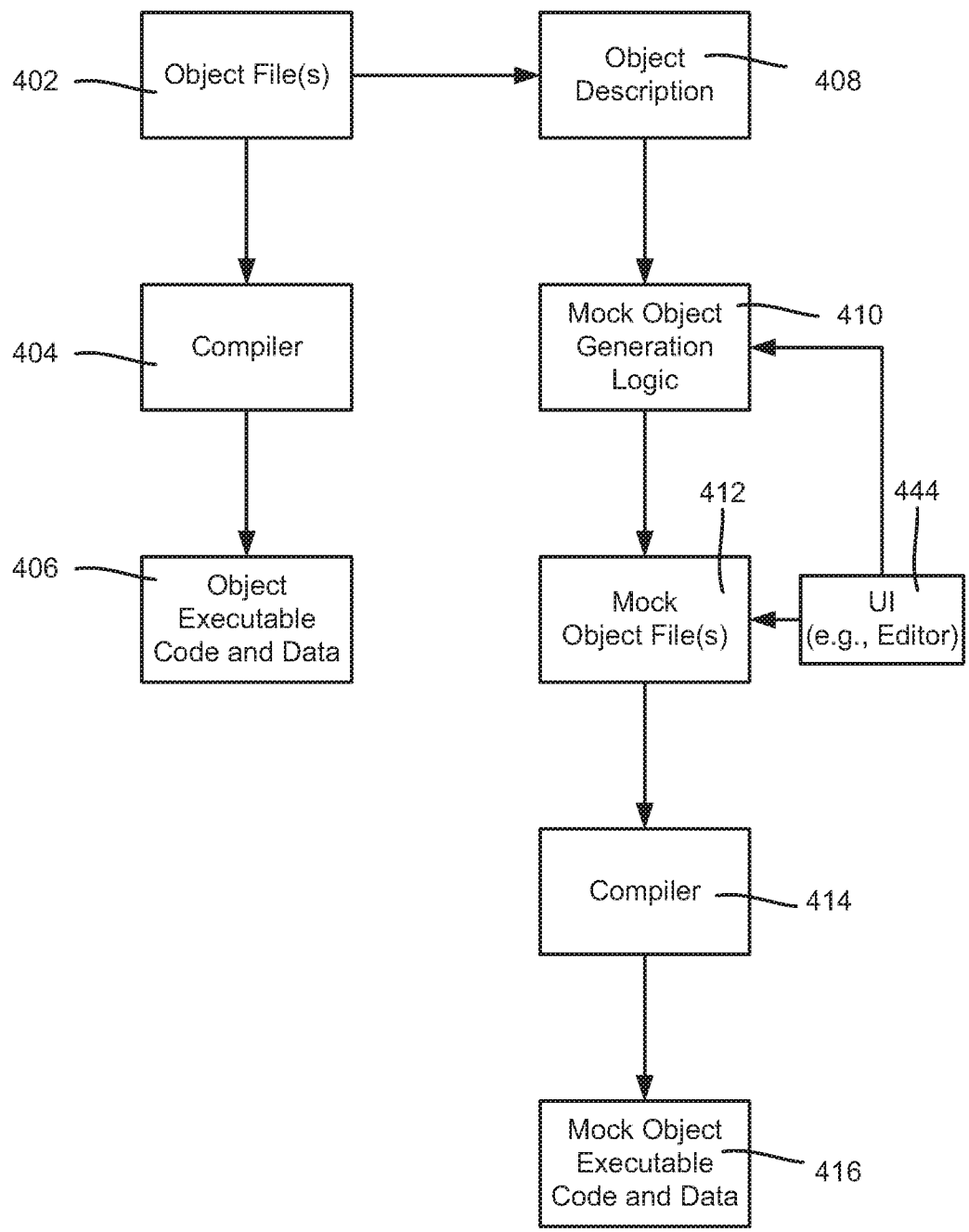
FIG. 4 is a block diagram showing various example components of an example real and mock object generation environment, including the use of optional editing, according to one or more example implementations.

FIG. 4 is similar to FIGS. 1 and 3, (with numerals labeling elements corresponding to those in FIGS. 1 and 3 generally labeled 4xx instead of 1xx or 3xx, respectively). In FIG. 4, a user interface 444 that for example may include an editor allows for manual changes to the mock object files, as well as to customize the mock object generation logic, e.g., to look for a particular condition and act on that condition when generating the mock object. Thus, for example, a developer can edit mock object code for an automatically generated method to add (or remove) some functionality. Alternatively, or in addition to, a developer can modify how the mock object generation logic 410 operates (by coding it and/or using input control parameters to the mock object generation logic 410). As a simplified example, the developer can code the mock object generation logic 410 to detect methods that include "if-then-else" decisions and when found, generate object code that handles such decisions. The developer may turn on or off such detection/decision handling logic insertion via a control parameter.

One platform/framework, e.g., used for streaming video playback, uses a type system called 'OOP', which in general comprises an object-oriented programming library developed to make it easier to declare and implement objects and object hierarchies in JavaScript® or similar technology. Note that the term class hierarchy is not used because JavaScript® does not have classes; it has only object instances. JavaScript® supports inheritance through prototypes rather than classes. The OOP enables mapping conventional object-oriented concepts such as class hierarchies, interfaces, and static methods and properties onto the JavaScript® prototypal object system. This type system thus includes the concept of both interfaces and classes that implement them.

In product code, an object often calls into other dependent objects expecting them to adhere to a particular interface, but not making assumptions about the concrete type of class code and data in that object. The technology of automatic mock generation, as set forth herein, takes advantage of this property to simplify the process of creating and maintaining mock objects for testing.

In one or more example implementation, the test framework of the platform generates mock objects automatically from OOP interfaces. In other implementations, other types of interfaces may be similarly used. This is achieved generically by defining a new mock class/object that implements the interface, by reflecting on the interface's properties and methods, and generating code in the new mock class definition that implements each of them. These new mock objects may be grouped into a mock namespace, whereby they can be utilized directly in unit tests wherever a class depends on a different concrete implementation of that interface.

In a mock object, the properties and methods of the interface are given stub implementations by default. This is often sufficient for many types of mock objects. Using an OOP documentation system, however, it is possible to improve upon this by both validating input data and returning mock output data, which may be automated. For example, FIG. 5 shows a representation of an example object text description 550.

The interface shown in FIG. 5 above has a single method, which is documented as accepting a number and returning a string. The automatically generated mock implementation of this interface can validate that when its own exampleMethod is called, its argument is of the correct type (it can do this by generating code in the mock to do so, and/or by generating its own documentation file, which is one way to validate arguments in OOP). The mock object can also return a default string in this example when the method is called, which is a valid response that the calling code that is being tested may need to handle. If the return value is an object, the mock can return a mock instance of that as well.

Figure 6:
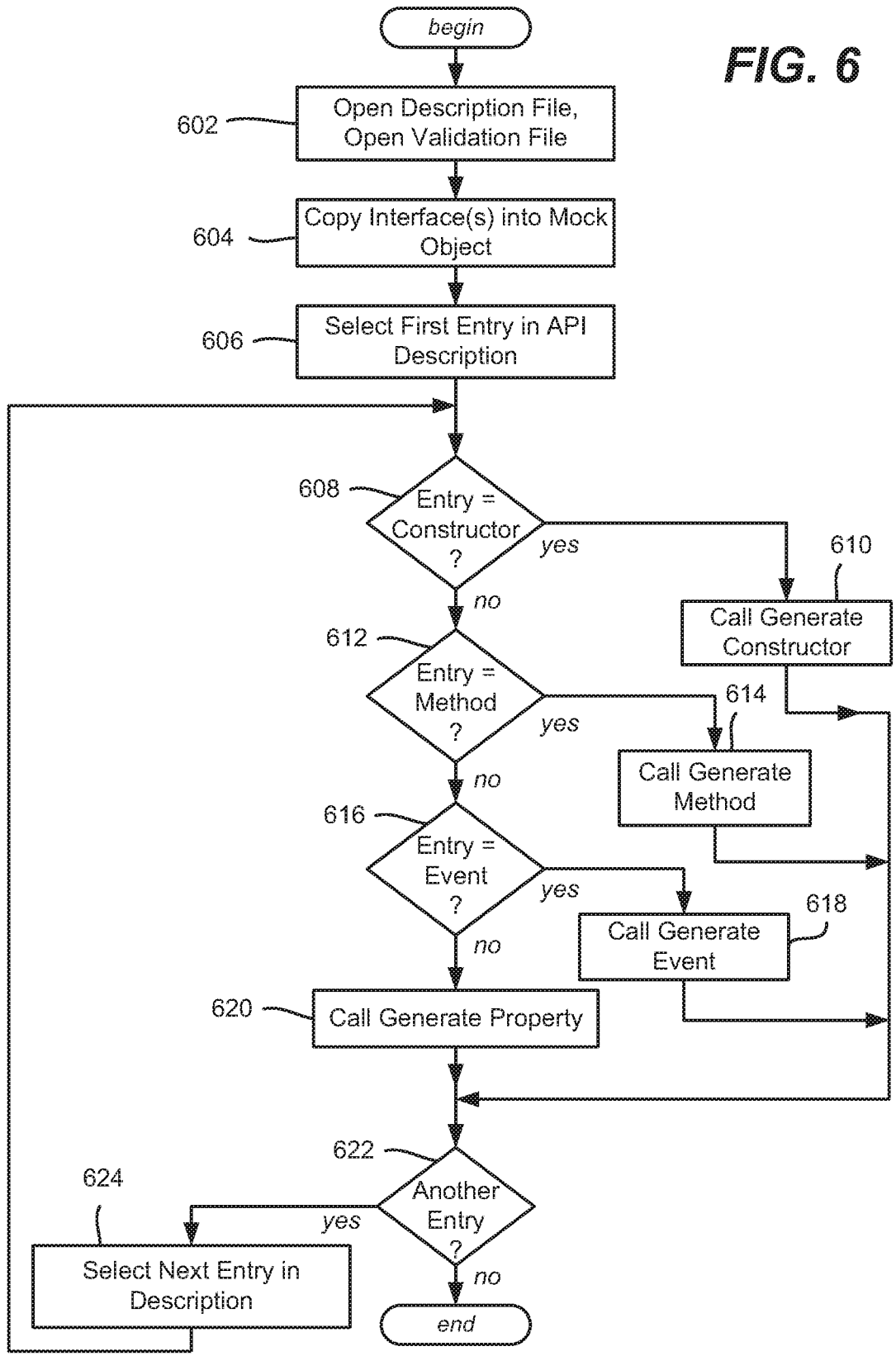
FIG. 6 is a flow diagram representing example steps that may be taken to process an object description into a mock object description, according to one or more example implementations.

FIG. 6 shows some example mock object generation logic (e.g., 110, FIG. 1) that may be used to convert the above example object description 550 of FIG. 5 into a mock object, such as called as a function GenerateMock( ) shown in FIG. 7A. In this example, for purposes of brevity consider that any object to be mocked may have only constructors, methods, events, and/or properties. Other objects in other environments may not have all of these, and also may include other concepts such as (but not limited to) base classes, collectors, friend classes, private interfaces and so on.

Step 602 opens the file or files that are processed into the mock object. Step 604 copies the interface or interfaces identified into the mock object, as well as any other data so that the mock object resembles the real object, but is invoked with a different UUID/name and so forth. Step 606 begins walking through the description to look for and if found generate the constructors, methods, events, and/or properties based upon the relevant entries in the description, e.g., skipping over other text.

As can be seen, in this example, the process in FIG. 6 checks whether the entry is a constructor at step 608, and if so, calls a generate constructor function at step 610. If not a constructor, the process checks whether the entry is a method at step 612, and if so, calls a generate method function at step 614, and so on for an event (steps 616 and 618). Note that in this example in which the object to be mocked may have only constructors, methods, events, and/or properties, then if not a constructor, method or event, the entry has to be a property at step 620.

Figure 8:
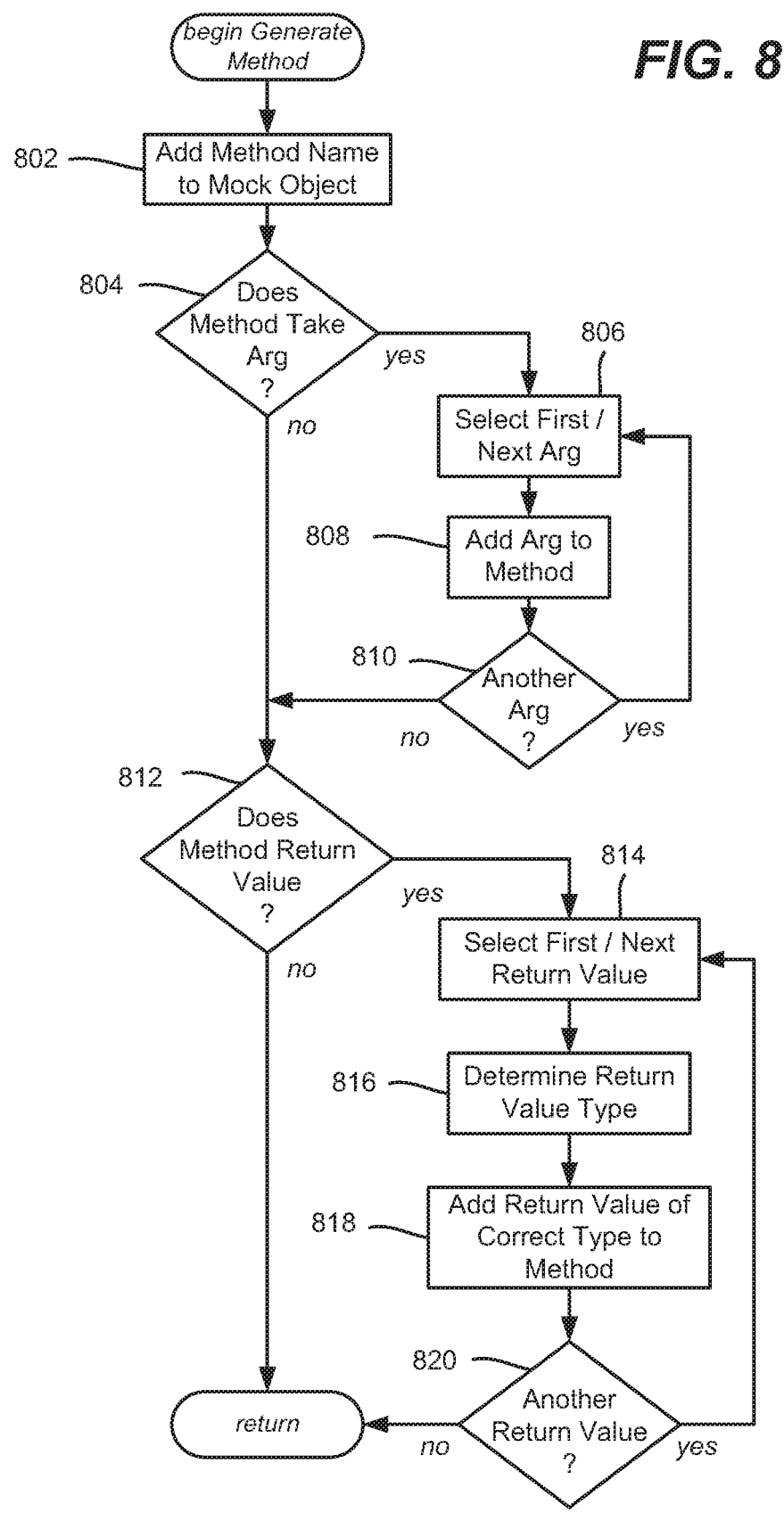
FIG. 8 is a flow diagram representing example steps that may be taken to process a description of a method in a real object into a mock object method description, according to one or more example implementations.

The process is repeated via step 624 until each of the entries is mocked. In this example, the only entry is a method, and thus the generateMethod function is called at step 614, corresponding to FIG. 7B and the example steps of FIG. 8. In general, the example generate method function of the mock object generation logic (e.g., 110, FIG. 1) first puts in a stub for the method (FIG. 7C), and then using the object description including validation (if available, or other text such as comments and so forth) fills in the appropriate method name (step 802 of FIG. 8), input argument or arguments (steps 804, 806, 808 and 810) and return value or values (steps 812, 814, 816 and 818) to the extent available.

As can be seen, because of accepting the proper arguments and returning the correct return value type, the mock object more closely resembles the real object. At the same time, the mock object may include no method logic, and thus is unlikely to contain any bugs. The calling object calls the mock object with an argument set, and receives the return value set, as it would if calling the real object. A hardcoded string for example may be returned for each call.

As described above, however, a developer may enhance the mock object with some actual functionality. Returning to the above example, a certain hardcoded string may be needed for the calling object to continue functioning properly for a given text, e.g., a four character string starting with the letters "ab"—"ab$H" is one suitable example. The developer may put this in manually, or the mock object generation logic may be designed to extract this information automatically from a comment or other semantic hint.

In general, any improvements to the detail or specificity of the documentation system are directly transferable to enhance mock objects in tests by making them more closely resemble the real object, to the extent desired by the developer. Any changes to the program interfaces themselves are automatically reflected in the mock objects without duplicated effort from the developer.

Mock objects also may be used to reduce development time when creating a new real object or modifying an existing real object into a new real object. For example, instead of starting from scratch or from an already existing real object, a developer can generate a relatively very "clean" mock object, and thereafter edit the mock object to include only those interfaces desired in the new real object, as well as possibly add new interfaces. Methods, properties and so on may be added, copied, modified and/or deleted in the new object.

Turning to another aspect, in a dynamic language, it is straightforward to modify the type system itself dynamically while a program is running. The program code (e.g., application) itself can be configured at run-time to turn any given type into a mocked version of that type. This would be useful, for example, if a particular part of the application is in a non-functional state—a developer may mock that out and continue to work in another area.

For example, a mock object may be dynamically substituted in place of a real object including in a testing or other environment in which the substitution is deemed to be more desirable than not. Consider that some real object needs network connectivity to function properly; if network connectivity is not present, the real object throws an exception, which is ordinarily desirable behavior. However, in certain situations such as when performing a given test, it may be deemed more desirable to not stop the test when network connectivity is not present, but rather continue testing. Even though not initially running in an environment, a mock object may be dynamically substituted for the real object if network connectivity goes down at the wrong time during a test. One way this may be done is to modify the exception handler so as call back to the mock object (instead of halting the program) when the real object throws the corresponding exception. Other ways include having an event handler monitor network connectivity and redirect between using the real object and the mock object whenever a change to network connectivity state is detected.

As can be seen, the technology described herein provides a solution for mocking external dependencies, such as used in unit test isolation of objects. By generating mock objects automatically or mostly automatically, the tedium of writing and maintaining mock objects for new or modified counterpart real objects is substantially reduced or eliminated. At the same time, mock objects may be designed to include as much or as little functionality as desired by a developer.

One or more aspects are directed towards generating a mock object from a description of a real object, including parsing the description with mock object generation logic to determine an interface set and a method set that exist within the real object, replicating the interface set of the real object in the mock object, and simulating the method set of the real object in the mock object.

Replicating the interface set of the real object in the mock object and simulating the method set of the real object in the mock object may include generating a description of the mock object and compiling the description of the mock object into the mock object.

One or more aspects may be directed towards calling the mock object from a calling object, and simulating the method set by returning a return value as a type expected by the calling object. The return value type may be determined from automatically generated validation data. The method may accept an argument as a type provided by the calling object, which may be determined from automatically generated validation data.

One or more aspects may be directed towards simulating a constructor set of the real object in the mock object, simulating an event set of the real object in the mock object and/or simulating a property set of the real object in the mock object.

Further described herein is automatically generating an updated mock object when the real object or real object class is modified, using the mock object in place of the real object to test one or more real objects and/or using the mock object in a mock object set to test one or more real objects. Using the mock object in the mock object set may include dynamically substituting the mock object for a real object while a program is running.

One or more aspects are directed towards mock object generation logic, including logic that processes a description of a real object into a mock object description that is configured for compilation or interpretation into an executable mock object. The logic is configured to copy an interface set from the description of the real object into the mock object description, and to simulate a method set from the description of the real object into the mock object description. The logic that processes the description of the real object may be further configured to simulate any constructor set from the description of the real object into the mock object description, simulate any event set from the description of the real object into the mock object description, and simulate any property set from the description of the real object into the mock object description.

The mock object generation logic may use automatically generated validation data to determine one or more argument types and/or one or more return types, or both one or more argument types and one or more return types. An execution environment may run the mock object, which is configured when being run to return calls from a calling object that are made to any interface of the interface set and any method of that interface, One or more aspects may be directed towards generating a mock object from a description of a real object, including parsing the description with mock object generation logic to determine an interface set within the real object, and replicating the interface set of the real object in the mock object. This may include parsing the description with the mock object generation logic to determine a method set of the real object and simulating the method set of the real object in the mock object, parsing the description with the mock object generation logic to determine a constructor set of the real object and simulating the constructor set of the real object in the mock object, parsing the description with the mock object generation logic to determine an event set of the real object and simulating the event set of the real object in the mock object and/or parsing the description with the mock object generation logic to determine a property set of the real object and simulating the property set of the real object in the mock object.

Replicating the interface set of the real object in the mock object may include generating a description of the mock object and compiling the description of the mock object into the mock object. Simulating the method set of the mock object may include returning a return value as a type expected by a calling object.

Example Computing Device

The techniques described herein can be applied to any device or set of devices capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 9 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 9:
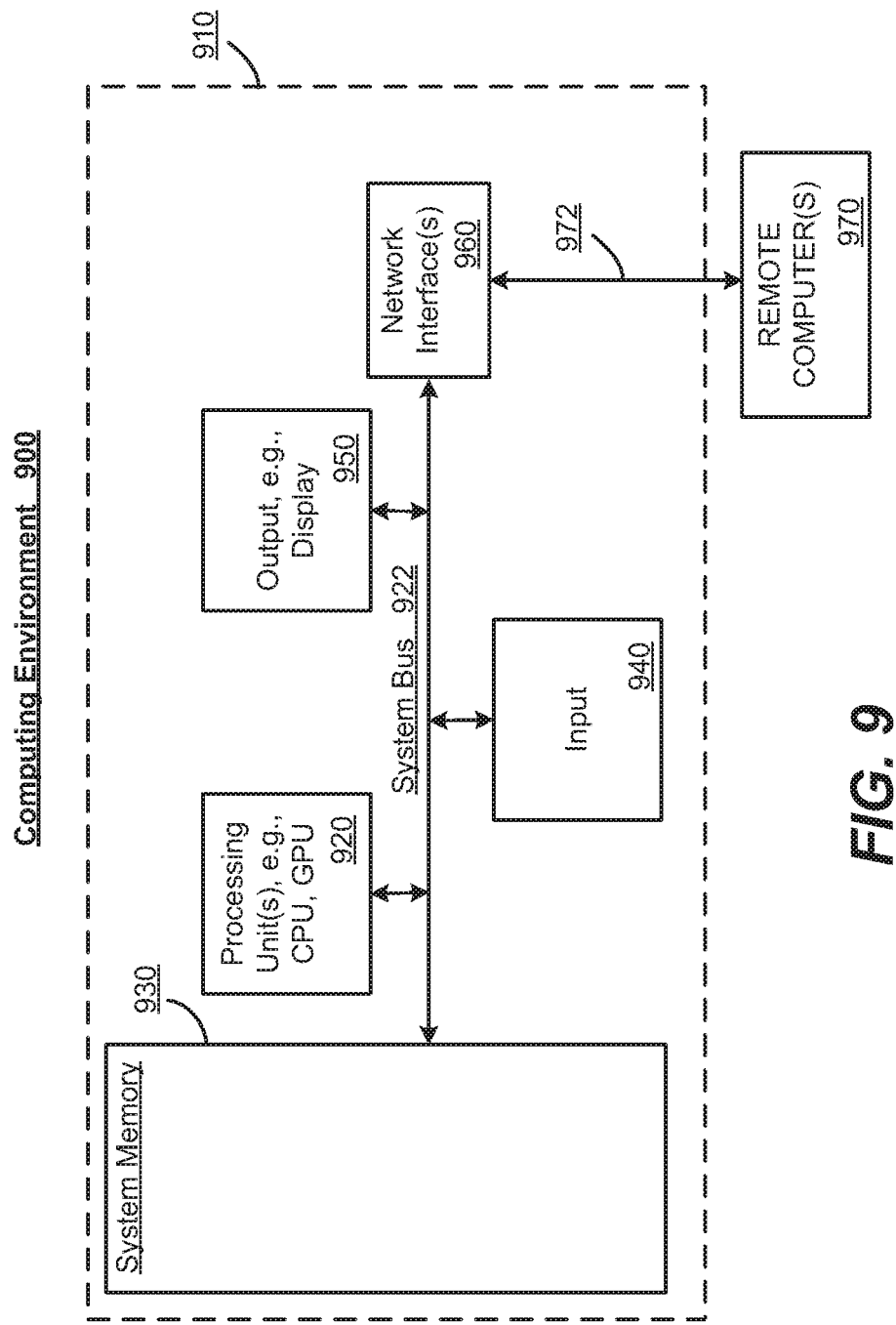
FIG. 9 is a block diagram representing an example computing environment, into which aspects of the subject matter described herein may be incorporated.

FIG. 9 thus illustrates an example of a suitable computing system environment 900 in which one or aspects of the implementations described herein can be implemented, although as made clear above, the computing system environment 900 is only one example of a suitable computing environment and is not intended to suggest any limitation as to scope of use or functionality. In addition, the computing system environment 900 is not intended to be interpreted as having any dependency relating to any one or combination of components illustrated in the example computing system environment 900.

With reference to FIG. 9, an example device for implementing one or more implementations includes a general purpose computing device in the form of a computer 910. Components of computer 910 may include, but are not limited to, a processing unit 920, a system memory 930, and a system bus 922 that couples various system components including the system memory to the processing unit 920.

Computer 910 typically includes a variety of machine (e.g., computer) readable media and can be any available media that can be accessed by a machine such as the computer 910. The system memory 930 may include computer storage media in the form of volatile and/or nonvolatile memory such as read only memory (ROM) and/or random access memory (RAM), and hard drive media, optical storage media, flash media, and so forth. By way of example, and not limitation, system memory 930 may also include an operating system, application programs, other program modules, and program data.

A user can enter commands and information into the computer 910 through one or more input devices 940. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
 parsing, by a system including a processor, a description language document describing a real object to determine a first description of an interface set of the real object and a second description of a method set of the real object, wherein the real object is called upon by at least one other real object;
 generating, by the system, one or more mock object generation files comprising the first description and the second description;
 parsing, by the system, the description language document to determine a constructor set for the real object, wherein the generating the one or more mock object generation files comprises including a third description of the constructor set in the one or more mock object generation files,
 parsing, by the system, the description language document to determine an event set and a property set for the real object, wherein the generating the one or more mock object generation files comprises including the third description of the event set and the property set in the one or more mock object generation files, and
 compiling, by the system, the one or more mock object generation files to generate a mock object of the real object, wherein the mock object replicates the interface set of the real object and simulates the method set, the constructor set, the event set and the property set of the real object.

2. The method of claim 1, wherein parsing the description language document comprises parsing at least one of Interface Description Language or Object Definition Language.

3. The method of claim 1, wherein the at least one other real object is to be unit tested, and further comprising, calling the mock object from the at least one other real object during unit testing, and receiving, from the mock object, a return value as a type expected by the at least one other real object.

4. The method of claim 3, further comprising, determining the type for the return value from automatically generated validation data.

5. The method of claim 1, further comprising, calling the mock object from the at least one other real object during unit testing, and simulating the method set comprising accepting an argument as a type provided by the at least one other real object.

6. The method of claim 5, wherein the simulating comprises determining the type for the argument from automatically generated validation data.

7. The method of claim 1, further comprising, automatically generating an updated mock object in response to the real object being modified.

8. The method of claim 1, further comprising, using the mock object in place of the real object to test the at least one other real object.

9. The method of claim 1, further comprising, using the mock object in a mock object set to test one or more calling objects.

10. The method of claim 9, wherein using the mock object in the mock object set comprises dynamically substituting the mock object for the real object while the one or more calling objects are running.

11. A system, comprising:
 a memory that stores computer-executable components and
 a processor that executes the computer-executable components store in the memory, wherein the computer-executable components comprise:
 a mock object generation logic component that parses a description language document describing a real object to determine a first description of an interface set of the real object and a second description of a method set of the real object, wherein the real object is called upon by at least one other real object;
 a compiler component that compiles the first description and the second description into a mock object of the real object, wherein the mock object comprises an interface set corresponding to the interface set of the real object, and wherein the mock object is configured to simulate a method set corresponding to the method set of the real object; and wherein the mock object generation logic component further parses the description language document to determine a third description of a constructor set of the real object, an event set of the real object, and a property set of the real object, and wherein the compiler component further compiles the third description into the mock object.

12. The system of claim 11, wherein the mock object generation logic component uses automatically generated validation data to determine at least one of an argument type or a return type of the second description of the method set of the real object.

13. The system of claim 11, wherein the mock object returns calls from the at least one other real object that are made to any interface of the interface set and any method of that interface.

14. One or more machine-readable storage media having machine-executable instructions that, perform operations comprising:

parsing a description language document describing a real object to determine a first description of an interface set of the real object and a second description of a method set of the real object, wherein the real object is called upon by at least one other real object;

generate a mock object of the real object using the first description and the second description, wherein the mock object replicates the interface set of the real object and simulates the method set of the real object; and wherein the parsing further comprises parsing the description language document to determine a third description of a constructor set, an event set and a property set of the real object, wherein the generating comprise generating the mock object using the third description, and wherein the mock object simulates the constructor set, the event set and the property set of the real object and compiles the third description into the mock object.

15. The one or more machine-readable storage media of claim 14, wherein the operations further comprise calling the mock object from the at least one other real object, and receiving, from the mock object, a return value as a type expected by the calling at least one other real object.

* * * * *